Sept. 12, 1944.  R. S. HOPKINS  2,357,827
PHOTOGRAPHIC COPYING APPARATUS
Filed Nov. 26, 1941  4 Sheets-Sheet 1
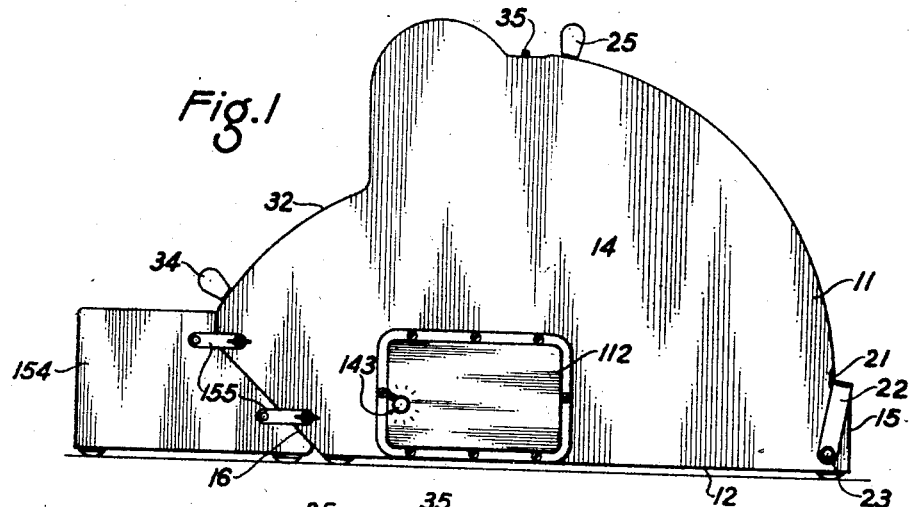
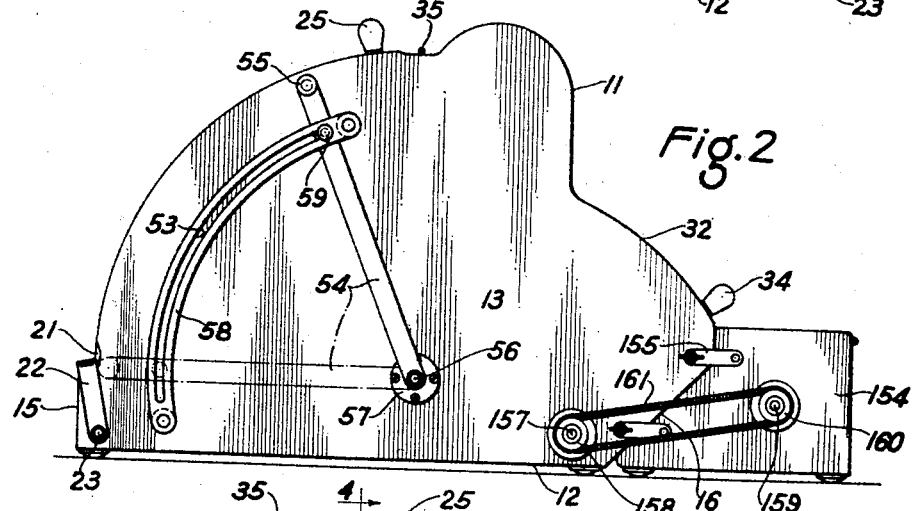
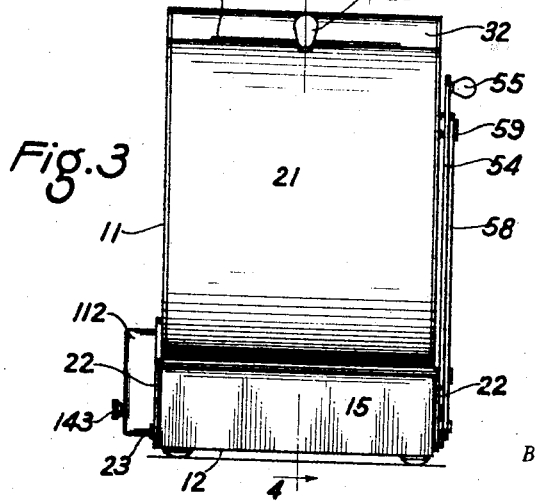
Roy S. Hopkins
INVENTOR
BY
ATTORNEY Sept. 12, 1944. R. S. HOPKINS 2,357,827
PHOTOGRAPHIC COPYING APPARATUS
Filed Nov. 26, 1941 4 Sheets-Sheet 2

Roy S. Hopkins
INVENTOR
BY
ATTORNEYS

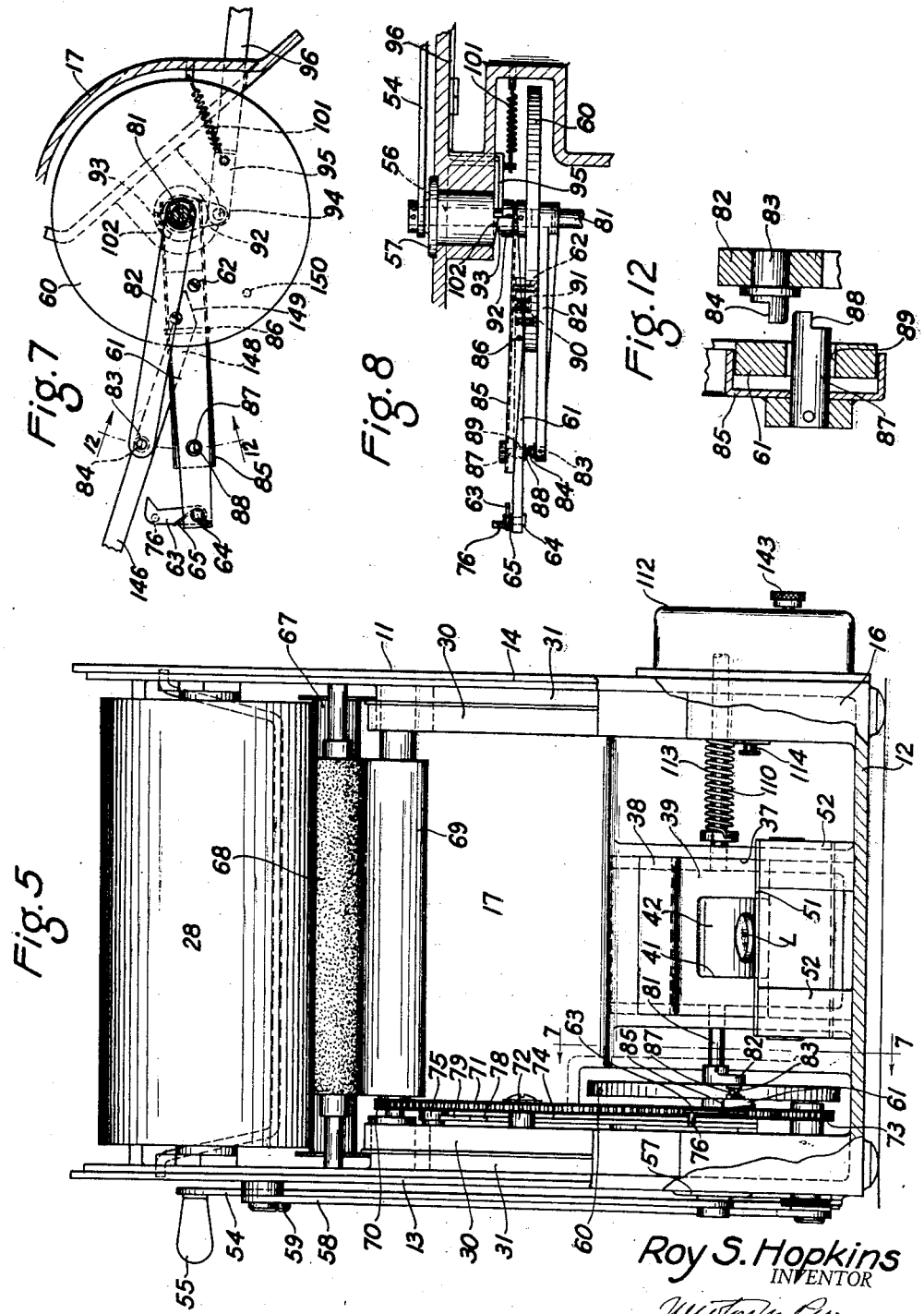

Sept. 12, 1944.  R. S. HOPKINS  2,357,827
PHOTOGRAPHIC COPYING APPARATUS
Filed Nov. 26, 1941  4 Sheets-Sheet 4
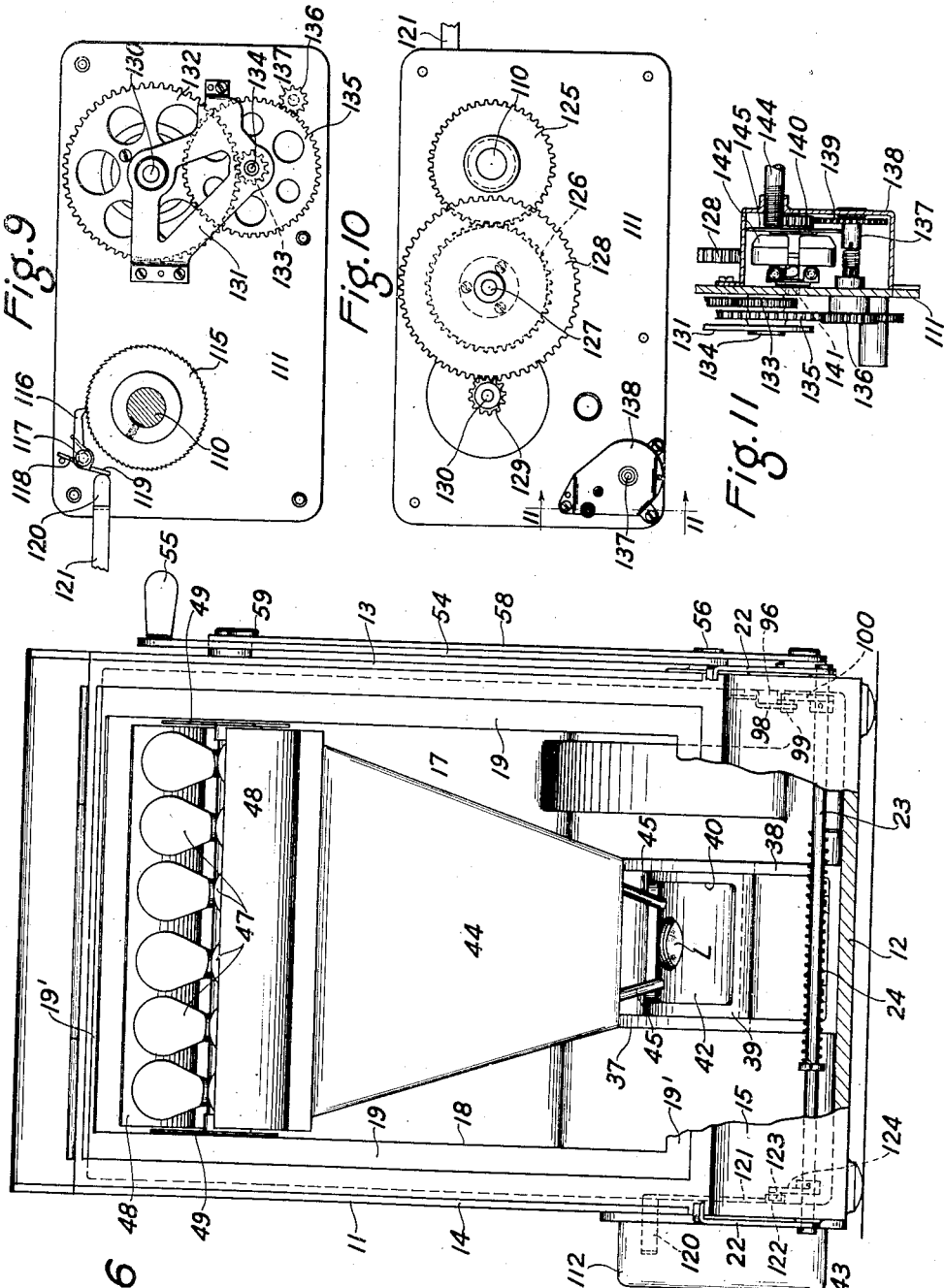
Roy S. Hopkins
INVENTOR
BY
ATTORNEYS Patented Sept. 12, 1944

2,357,827

UNITED STATES PATENT OFFICE 2,357,827

PHOTOGRAPHIC COPYING APPARATUS

Roy S. Hopkins, Rochester, N. Y., assignor to Eastman Kodak Company, Rochester, N. Y., a corporation of New Jersey Application November 26, 1941, Serial No. 420,550

16 Claims. (Cl. 88—24)

The present invention relates to photographic copying apparatus and more particularly to an apparatus in which the document being copied is projected to a sensitized material in successive portions.

The primary object of the invention is to provide an exact copy of a document by projecting successive portions of the document onto a sensitized material.

Another object of the invention is to provide a rotatable projecting system associated with a member adapted to scan and illuminate successive portions of the document.

A further object is to provide a reflecting medium so positioned with respect to the projecting system and the sensitized material that the image of the document will be inversed to give a true copy of the document.

A still further object of the invention is to provide an operating means that will advance the sensitized material a predetermined amount when moved in one direction and position the rotatable projecting system, in accordance with the size of the document, when moved in the opposite direction.

And yet another object is to provide operable connections between a platen for holding the document in position and the operating means, the drive for the projecting system and the illuminating means, so that the various parts will function in a definite manner as the platen is moved from an inoperative position to the position it assumes for holding the document.

And still another object is to provide an apparatus of the type described which is easy to operate, cheap to manufacture, and efficient in operation.

Other and further objects of the invention will be suggested to those skilled in the art by the description which follows.

The above and other objects of the invention are embodied in a photographic copying apparatus having a casing, a document position and an exposure field, comprising in combination, an arcuate support for the document, a second arcuate support for the sensitized material in the exposure field, a projecting means associated with a scanning means for projecting successive portions of the document onto the sensitized material, a reflecting medium for laterally inversing the document image, an operating means for advancing the sensitized material a predetermined amount when moved in one direction and for positioning the projecting means in accordance with the size of the document when moved in the opposite direction, drive means for the projecting means, means for varying the angular velocity of the projecting means, means for indicating on the sensitized material the amount of material exposed, and finally, operable connections between a platen for holding the document and the operating means, the illuminating means for the document on the scanning means and the drive means for the projecting system, so that the proper sequence of operation may be controlled by the platen.

Reference is hereby made to the accompanying drawings wherein like reference characters designate similar parts and wherein:

Fig. 1 is a right side elevation of the photographic copying apparatus described herein;

Fig. 2 is a left side elevation of the same;

Fig. 3 is a front elevation of the same;

Fig. 5 is a rear elevation of the apparatus with the cover removed and a portion of the casing broken away;

Fig. 6 is a front elevation of the apparatus with the platen removed and a portion of the casing broken away;

Fig. 7 is a partial sectional view taken substantially on the line 7—7 of Fig. 5 showing the operable connection between the operating means and the projecting means;

Fig. 8 is a plan view of the mechanism shown in Fig. 7;

Fig. 9 is a right side elevation of the mechanism for varying the exposure;

Fig. 10 is a left side elevation of the same mechanism;

Fig. 11 is a vertical sectional view taken substantially on the line 11—11 of Fig. 10; and Fig. 12 is a sectional view taken substantially on the line 12—12 of Fig. 7 showing the connecting means between the actuating means and the projecting means.

Figure 4:
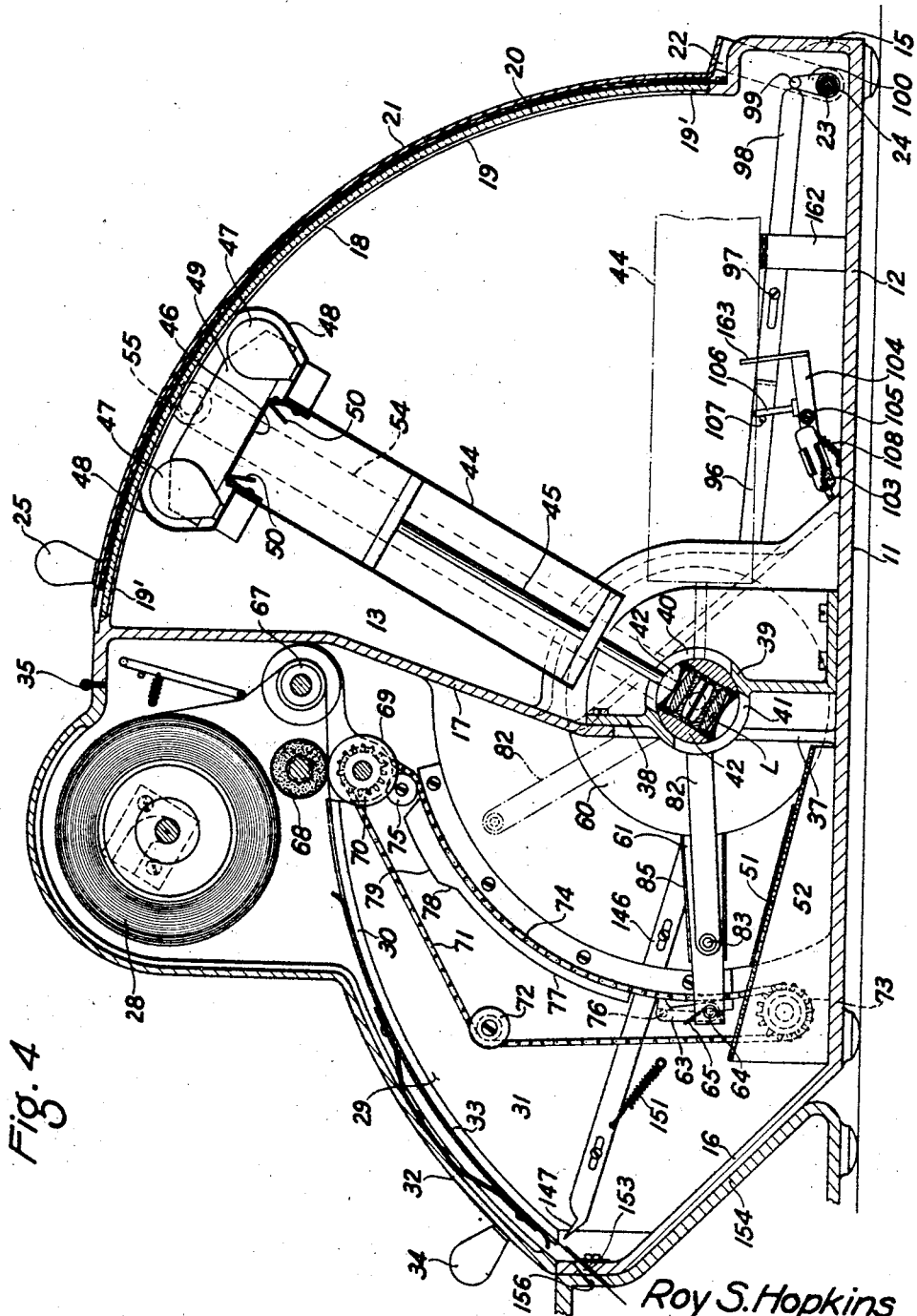
Fig. 4 is a transverse sectional view taken substantially on the line 4—4 of Fig. 3.

The reproduction of documents or letters onto a sensitized material is accomplished in many instances by a machine operating on the usual photographic principle. However, machines operating on this principle are somewhat bulky in nature and not readily movable from one place to another and necessitate that any documents or letters that are to be copied must be removed to either a photographic department within the company or organization, or to an outside concern specializing in such reproductions. It often happens that such arrangements are not always feasible, in that the document or letter may be needed for constant reference or circulated amongst several persons within a short space of time. To overcome these difficulties, the apparatus about to be described is of such size that it can be readily moved or carried by one person and is capable of making exact copies of any letters, documents, etc., within the standard sizes. The copy may be developed and fixed immediately after the exposure has been made or may be developed and fixed in strip form along with other reproductions. In spite of its compactness and ease of operation, this apparatus is comparable in performance to other and bulkier types of reproduction machines used for similar purposes.

In the illustrated embodiment of the invention the photographic copying apparatus comprises a casing 11 having a bottom 12, side walls 13 and 14, a partial front wall 15, a partial rear wall 16 and a dividing partition 17. The shape of these various walls can be best understood by referring to the accompanying drawings. The front wall 15 has an opening 18, an arcuate recessed portion 19 along the sides of the opening 18, and a similar recessed portion 19' along the top and bottom of the opening 18 to form a ledge or support for an arcuate transparent plate 20 which may be glass or any other similar transparent material and may be designated, broadly, as the document position.

An arcuate platen 21, which is complementary in shape to the plate 20, is pivotably mounted on the casing 11 by the turned down ears 22 formed thereon, and which are secured to the shaft 23 carried by the side walls 13 and 14 in the forward end of the casing 11. The inner face of the platen 21 may be covered by a suitable layer of felt or similar material to eliminate any light leakage or breaking of the glass plate 20 and is held in close contact with the document or the plate 20 by the spring 24 on the shaft 23. A handle 25 is provided on the forward end of the platen for moving the platen from an open to a closed or document holding position, or vice versa.

With the exception of the partial rear wall 16, the rear end of the casing 11 is entirely open to permit the insertion of the roll of sensitized material 28 and the placing of the sensitized material in its proper position in the exposure field 29. The exposure field 29 may be defined as that portion of the sensitized material that is supported by the arcuate tracks or ledges 30 mounted on complementary shaped extensions 31 on the side walls 13 and 14. A cover 32, which has a pressure pad 33 mounted thereon to hold the sensitized material on the tracks 30, is provided with a handle 34 and hinged to the casing 11 at 35 and, in the closed position, completely encloses the rear wall of the casing 11, as shown in Fig. 4.

The partition 17 is provided with an opening 37 which is covered by the bracket 38 secured to the partition 17. The bracket has a cylindrical portion 39, which is provided with openings 40 and 41, the purpose of which will be more fully described hereinafter. The projecting means comprises a tubular lens mount 42 which is rotatably mounted in the cylindrical portion 39 of the bracket 38 and carries the lens elements L. The lens elements L are so designed that the Gauss points of said elements coincide with the axis of rotation of the mount 42 as will be apparent from an inspection of Fig. 4.

The scanning means comprises a light restricting member 44, as best shown in Figs. 4 and 6, which is mounted on the connecting members 45 secured to the tubular lens mount 42. The light restricting member 44 has mounted thereon, on each side of the opening 46 adjacent to the plate 20, a bank of lamps 47 for illuminating the document on the plate 20. Suitable reflectors 48 and 49 are mounted behind the lamps 47 extending substantially across the opening 18 and along the sides of the opening 46, respectively. On the inside of the light restricting member 42, adjacent the opening 46, are mounted anti-reflection strips 50. It can be readily appreciated from the foregoing description that only a portion or strip of the document placed on the plate 20 will be illuminated at any time, and the portion so illuminated will be directed by the light restricting member 44 through the opening 41 in the cylindrical portion 39 of the bracket 38 to the lens elements L. The projection of the document image onto the sensitized material will have to be laterally inversed to obtain a true reproduction of the document, and this is accomplished by positioning a suitable reflecting medium, such as the mirror 51 mounted on a support 52 on the bottom 12 of the casing 11, between the lens elements L and the sensitized material.

The operating means comprises, broadly, an actuating means, an advancing means for the sensitized material and a means for operably connecting the actuating means to the advancing means.

The actuating means comprises an operating member 54 provided with a handle 55 and oscillatably mounted on shaft 56 supported by the journal 57 secured to the side wall 13 of the casing 11. An arcuate member 58, is mounted on and spaced from the side wall 13 and is provided with an arcuate slot 53 for a stud 59 carried by the operating member 54 to guide and provide a bearing for the outer extremity of the operating member 54. A plate 60 is secured to the opposite end of the shaft 56 and carries an arm 61 secured thereto by the screws 62 as best shown in Figs. 7 and 8. A pawl 63, the purpose of which will be described hereinafter, is pivotally mounted at 64 on the arm 60 and is pressed in a clockwise direction by the coil spring 65.

The advancing means for the sensitized material comprises a guide roll 67, a friction roll 68 and a drive roll 69, all journalled in the side walls 13 and 14. The drive roll 69 has mounted thereon a sprocket 70 and is driven by the endless chain 71 which passes over the sprocket 70, the guide roll 72, a second sprocket 73 near the bottom of the casing 11, along a track 74 on the extension 31, and under a second guide roll 75. From an inspection of Fig. 4, it will be noted that the pawl 63 engages the chain 71 and is held in engagement therewith by the spring 65 to provide a means for operably connecting the drive means to the actuating means. As the operating member 54 is moved downward, the shaft 56, the plate 60, and the arm 61 are rotated therewith, and the pawl 63 will move the chain in a counter clockwise direction to turn the drive roll 69 and move the sensitized material along the tracks 30. A pin 76 is carried by the pawl 63 and rides on the upturned flange 77 on the track 74 to limit the engagement of the nose of the pawl 63 with the chain 71. Before the operating member reaches the end of its movement, the pin 76 will strike the cam surface 78, disengage the pawl 63 from the chain 71, and continue along the surface 79 until the operating member 54 reaches the end of its stroke. As the arm 61 is moved in the opposite direction, the pawl 63 will ride over the chain 71 due to the action of the spring 65.

A shaft 81, which is secured at one end to the lens mount 42, is journalled in the plate 60 in alignment with the shaft 56 and has secured thereto an arm 82. A stud 83 is carried by the arm 82 and has a flat portion 84 on the end extending beyond the arm 82, see Fig. 12. The arm 61 has mounted thereon a U-shaped member 85, which is pivoted at 86 and carries on one end a stud 87 having a flat portion 88 which extends through an opening 89 in the arm 61 in the path of the stud 83. The member 85 is pressed in a counterclockwise direction by the spring 90 seated in a recess 91 extending through the arm 61 and into the plate 60. Loosely mounted on the shaft 56 is a release member 92 having a lug 93 formed thereon, and an extended portion 94 on which the offset portion 95 of the lever 96 is pivotably mounted. The lug 93 cooperates with a cam surface 102 on the inner face of the journal 57 to pivot the member 85 in a clockwise direction, against the action of the spring 90 see Fig. 8, to remove the stud 87 from the path of the stud 83.

The lever 96 is pivotably mounted on the side wall 13 at 97, the end 98 of which engages a pin 99 carried by an arm 100 fixed to the shaft 23 and is maintained in engagement with the pin 99 by the spring 101, see Figs. 4, 7 and 8. A mercury switch 103 is mounted on a bracket 104 pivotably mounted to the side wall 13 at 105, having an upstanding arm 163, and is in a circuit with the lamps 47. A pin 106 carried by the bracket 104 is held in engagement with a pin 107 on the lever 96 by means of the spring 108. The purpose of the particular structure above described will be described hereinafter in a complete description of the operation of the apparatus.

The drive means for the projecting means comprises a shaft 110, in alignment with the shaft 81, secured to the opposite side of the lens mount 42 and extends through the side wall 14, which acts as a journal for the shaft, and through a mechanism plate 111 mounted within the housing 112. A coil spring 113 has one end thereof secured to the shaft 110 and the other end held by the stud 114 on the side wall 14, see Fig. 5, so that the spring 113 will be tensioned as the shaft 110 is turned in a counter clockwise direction. The shaft 110 has secured thereto, on the inside face of the plate 111, a ratchet 115 which is engaged by a pawl 116 pivotably mounted on the plate 111 at 117 and held in engagement with the ratchet 115 by the spring 118 to prevent the spring 113 from turning the shaft 110 in a clockwise direction. The pawl 116 has an extension or tail 119 in engagement with an offset portion 120 of a lever 121 slidably mounted on the side wall 14, the lever 121 having its other end 122 in engagement with a pin 123 on an arm 124 fixed to the shaft 23, see Fig. 6.

The shaft 110 has secured thereto, on the outside face of the plate 111, a gear 125 which meshes with a gear 126 on the shaft 127 carried by the plate 111. The gear 128, also on the shaft 127, meshes with the gear 129 on the shaft 130 which extends through the plate 111 and is journalled in the bracket 131 on the inside face of the plate 111. The shaft 130 supports a gear 132 that meshes with the gear 133 on the shaft 134 which also carries the gear 135 that meshes with the gear 136 on the shaft 137. The shaft 137 extends through the plate 111 and has the end journalled in a bracket 138 mounted on the outside face of the plate 111. A gear 139 is carried by the shaft 137 and meshes with a gear 140 fixed to a governor shaft 141. The governor 142 is of any suitable type, such as those used in movie cameras or the like, as shown in Fig. 11. The speed of the shaft 110 is varied by turning the knob 143 fixed to the threaded stud 144 which bears against the control plate 145 of the governor 142. A suitable exposure scale may be provided for various types of sensitized material on the outside of the housing 112 adjacent the knob 143.

The exposed sensitized material may be developed in separate lengths, depending on the size of the document, or in strips containing several exposed areas. To provide a means of indicating on the sensitized material the length that has been exposed, a lever 146 is slidably mounted on the wall 13 and has a nose 147 for puncturing the margin of the sensitized material after the actuating means has been disengaged from the advancing means for the sensitized material. The lever 146 has an offset portion 148 with a cam surface 149 that lies in the path of a pin 150 carried by the plate 60, see Fig. 7, and as the plate 60 is moved, the pin 150 strikes the cam surface 149 and moves the lever 146 forward against the action of the spring 151 until the nose 147 punctures the material.

The strip of sensitized material emerges from the casing 11 through a slot 153 in the rear wall 16. The length of sensitized material, as noted by the puncture formed by the nose 147 of the lever 146, may then be torn from the strip still within the casing. However, if it is desirable to develop the sensitized material in strips, a supplementary casing 154 may be attached to the casing 111 by the pivoted levers 155, as shown in Figs. 1 and 2. The casing 154 has a slot 156, in alignment with the slot 153 and a roll, not shown, on which the exposed strip may be wound up. A shaft 157, extending through the wall 13, has the sprocket 73 fixed thereto on the inside of the casing 11 and a pulley 158 on the outside. The shaft 159 supporting the windup roll has a pulley 160 mounted thereon which is connected to the pulley 158 by the spring wire belt 161. It can be readily understood that as the actuating means moves the advancing means for the sensitized material, the sprocket 73 will be turned by the movement of the chain 71, and through the shaft 157 will turn the pulley 158, the belt 161, the pulley 160, and the wind-up roll.

The operation of the photographic copying apparatus according to the invention, will now be described. After a document has been exposed, the scanning means comes to a stop against the block 162 as indicated in Fig. 4, by the dot-dash lines. As the light restricting member 44 reaches this point, it strikes the upstanding arm 163, turning the bracket 104 about its pivot 105 together with the mercury switch 103 to break the circuit and turn off the lamps 47. As the platen 21 is opened to remove the document from the glass plate 20, the shaft 23 is rotated and with it the arms 100 and 124 fixed thereto. As the arms 100 and 124 are moved in a clockwise direction by the platen 21, the lever 121 will move toward the front of the casing 11, due to a spring not shown, allowing the pawl 116 to engage the ratchet 115, and the lever 96 will also move toward the front of the casing 11 due to the spring 101 and turning the release member 92 on the shaft 56 to which it is connected in a clockwise direction so that the lug 93 rides off the cam surface 102 on the face of journal 57. The arm 82 fixed to the shaft 81 of the lens mount 42 then will have assumed the position as shown by the dot-dash lines in Fig. 4, and the operating member 54 the position shown by dot-dash lines in Fig. 2.

The next document to be copied is then placed on the plate 20, and the operating member 54 pulled downward by the handle 55, thereby rotating the shaft 56, the plate 60, and the arm 61 carried thereby. The pawl 63, which moves with the arm 61, is in engagement with the chain 71 and moves it along the track 74 as the pin 76 rides on the flange 77. The movement of the chain 71 rotates the guide rolls 72 and 75, the sprockets 70 and 73 and the drive roll 69 to move the sensitized material between the drive roll 69 and the friction roll 68 along the track 30 in the exposure field. Just before the operating member 54 reaches the end of its stroke, the pin 76 on the pawl 63 will strike the cam surface 78 to withdraw the pawl 63 from the chain 71 and will continue along the flange 79 until the operating member 54 reaches the end of its stroke. At the time the pin 76 on the pawl 63 reaches the flange 79, the pin 150 carried by the plate 60 will contact the cam surface 149 of the lever 146 and the continued rotation of the plate 60 will cause the pin to push the lever 146, against the action of the spring 151, until the nose 147 punctures the sensitized material to indicate the line for cutting. The sensitized material leaves the casing 11 through the slot 153 and, as pointed out beforehand, may be wound up on a roll in the casing 154 which is driven by the pulley 158 on the shaft 157 connected to the sprocket 73.

As the operating member reaches the end of its downward stroke, the stud 87 on the U-shaped member 85 will strike the stud 83 on the arm 82 causing the U-shaped member 85 to pivot slightly in a clockwise direction to allow the stud 87 to pass the stud 83. At the instant the stud 87 passes the stud 83, the operating member 54 will have reached the end of its downward movement, and the member 85 will rotate in the opposite direction, due to the spring 99, so that the flat portions of the studs 87 and 83 will be latched together, as shown in Fig. 5.

As the operating member 54 is moved in an upward or reverse direction, the arm 61 which is latched to the arm 82 is moved as a unit downwardly until the operating member 54 is brought opposite the upper extremity of the document to be reproduced. The pawl 63 carried by the arm 61 rides over the chain 71 against the action of the spring 65 and engages the chain when the operating member is brought to a stop. The latch connection between the arms 61 and 82 rotates the shaft 81 and thereby the lens mount 42 to which it is fixed. As the lens mount 42 is rotated from an inoperative position to a position adjacent the upper extremity of the document, the scanning means including the light restricting member 44 and the lamps 47, is moved therewith, being connected to the lens mount 42 by the connecting members 45, and assumes a position similar to that shown in Fig. 4.

Reversing the movement of the operating member 54 also causes the pin 150 on the plate 60 to be moved away from the cam surface 149 on the lever 146 to permit the spring 151 to withdraw the nose 147 from the sensitized material.

As the operating member 54 is moved in its reverse direction, the lens mount 42 is rotated through the latch connection between the arm 61 and the arm 82, thereby rotating the shaft 110 fixed to the opposite side of the lens mount 42. As the shaft 110 is rotated, the spring 113, having one end fixed thereto, is tensioned and retained in its tensioned state by the pawl 116 mounted on the mechanism plate 111 engaging the ratchet 115 on the shaft 110, the entire gear train on the mechanism plate 111 being rotated as the shaft 110 is rotated.

When the operating member has reached the upper extremity of the document and has been brought to a stop, the platen 21 may be brought forward to its holding position and held firmly in position by the action of the spring 24. The arms 100 and 124 fixed to the shaft 23 are rotated in a counterclockwise direction to simultaneously move the levers 96 and 121 toward the rear of the casing. As the lever 121 is moved rearwardly the offset portion 121 will strike the extension 119 on the pawl 116 to disengage it from the ratchet 115, thereby, releasing the spring 113 that has been held under tension, to permit the rotation of the lens mount 42 together with the light restricting member 44 and the lamp 47. The angular velocity of the projecting and scanning means will be determined by the governor 142 connected to the shaft 110 through the gears 125, 126, 128, 129, 132, 133, 135, 136, 139 and 140. Movement of the lever 95 rearwardly moves the pin 107 therewith, and the pin 106 carried by the bracket 104 is maintained in engagement with the pin 107 by the spring 108 fixed to the bracket. As the bracket 104 pivots to maintain the pin 106 against the pin 107, the mercury switch is tilted, thereby closing the circuit and turning on the lamps 47. The rearward movement of the lever 95, which is connected to the release member 92 on the shaft 56, rotates the release member 92 in a clockwise direction to move the lug 93 along the cam surface 102 of the journal 57, thereby moving the release member axially along the shaft 56 against the U-shaped member 85. The movement of the release member 92 along the shaft 56 is such that it will cause the member 85 to turn about its pivot 86 to release the stud 87 from the stud 83 on the arm 82, thereby permitting the rotation of the projecting and scanning means independent of the actuating means, as shown in Fig. 7.

The scanning means will move with the projecting means about the axis of rotation of the projecting means to expose successive portions of the document on the plate 20 and come to rest against the stop 162, the lamps will then be turned off and opening of the platen 21 will lock the drive means until the operating member 54 is again moved. The arm 82 will always occupy the same position when the document has been exposed, but the point at which the actuating means is released from the projecting means will be dependent on the position of the operating member 54 with respect to the size of the document being copied. It may also be pointed out that the scanning means may be considered to be part of the projecting means.

It is obvious that other mechanical arrangements may be used or provided and the photographic copying apparatus disclosed herein is merely illustrative.

Having now particularly described my invention what I desire to secure by Letters Patent of the United States and what I claim is:

1. In a photographic copying apparatus having a document position and a stationary exposure field, the combination with an arcuate document supporting means for supporting a document in said document position, a second stationary arcuate supporting means spaced from said first mentioned supporting means and for supporting a sensitized material in said exposure field, of a scanning means having an oscillating movement with respect to said document position and providing a scanning field which is narrow and has a length equal to a corresponding dimension of the document position whereby said document position is covered by a single movement of the scanning means thereacross, and a projecting means rotatable about its Gauss point and associated with and having the same angular movement as said scanning means for directing successive portions of the document image from said scanning means onto the sensitized material.

2. In a photographic copying apparatus having a document position and an exposure field, the combination with a stationary arcuate document supporting means for supporting a document in said document position, a second stationary arcuate supporting means adjacent said first mentioned supporting means and for supporting a sensitized material in said exposure field, said arcuate document supporting means and said second arcuate supporting means having different centers of curvature, of a scanning means mounted for oscillating movement across said document position and for scanning a document in said document position, a projecting means rotatable about its Gauss point and associated with and having the same angular movement as said scanning means, both of said stationary arcuate supporting means being on the same side of a line through said Gauss point, and a reflecting member for directing successive portions of the document image from said scanning means onto the sensitized material.

3. In a photographic copying apparatus having a document position and an exposure field, the combination with an arcuate document supporting means for supporting a document in said document position, a second arcuate supporting means spaced from said first mentioned supporting means for supporting a sensitized material in said exposure field, of a scanning means having an oscillating movement with respect to said document position and providing a scanning field which is narrow and has a length equal to a corresponding dimension of the document position whereby said document position is covered by a single movement of the scanning means thereacross, a rotatable projecting means associated with and having the same angular movement as said scanning means for directing successive portions of the document image from said scanning means onto the sensitized material, and a reflecting means fixedly positioned between said projecting means and said arcuate supporting means to give lateral inversion of said document image.

4. In a photographic copying apparatus having a casing, a document position and an exposure field, the combination with a stationary arcuate document supporting means, including an arcuate transparent sheet for positioning the document thereon and an arcuate support on said casing for said transparent sheet, a second stationary supporting means spaced from the first mentioned supporting means, including an arcuate support on said casing for the sensitized material in said exposure field and a platen hinged to said casing for holding said sensitized material on said arcuate support, of a scanning means having an oscillating movement with respect to said document position and providing a scanning field which is narrow and has a length equal to a corresponding dimension of the document position whereby said document position is covered by a single movement of the scanning means thereacross, and a projection means rotatable about its Gauss point and associated with and having the same angular movement as said scanning means for directing successive portions of the document image from said scanning means onto the sensitized material.

5. In a photographic copying apparatus having a casing, a document position and an exposure field, the combination with a stationary arcuate document supporting means for supporting a document in said document position, a second stationary arcuate supporting means spaced from said first mentioned supporting means for supporting a sensitized material in said exposure field, of a scanning means including a light restricting member providing a scanning field which is narrow and has a length equal to the corresponding dimension of the document position and illuminating means carried by said light restricting member adjacent said document position, said scanning means being mounted for oscillating movement and covering said document position by a single movement of the scanning means thereacross, and a rotatable projecting means associated with and having the same angular movement as said scanning means, including a lens mount rotatable about its Gauss point and for directing successive portions of the document image from said scanning means onto the sensitized material, means for connecting said scanning means to said lens mount, and a mirror fixedly positioned between said lens mount and said sensitized material to give lateral inversion of said document image.

6. In a photographic copying apparatus having a casing, a document position and an exposure field, the combination with an arcuate document supporting means for supporting a document in said document position, a second arcuate supporting means spaced from said first mentioned supporting means for supporting a sensitized material in said exposure field, of a scanning means mounted for angular movement and positioned between said document position and said exposure field for scanning a document in said document position, a rotatable projecting means associated with and having the same angular movement as said scanning means for directing successive portions of the document image from said scanning means onto the sensitized material, and an operating means adapted to advance said sensitized material a predetermined amount when moved in one direction and also adapted to be automatically connected to said projecting means at the end of the movement in said one direction for positioning said scanning means and projecting means in accordance with the size of said document when moved in the opposite direction.

7. In a photographic copying apparatus having a casing, a document position and an exposure field, the combination with an arcuate document supporting means for supporting a document in said document position, a second arcuate supporting means spaced from said first mentioned supporting means for supporting a sensitized material in said exposure field, of a scanning means mounted for angular movement and positioned between said document position and said exposure field for scanning a document in said document position, a rotatable projecting means associated with and having the same angular movement as said scanning means for directing successive portions of the document image from said scanning means onto the sensitized material, an operating means adapted to advance said sensitized material a predetermined amount when moved in one direction and also adapted to be automatically connected to said projecting means at the end of the movement in said one direction for positioning said scanning means and projecting means in accordance with the size of said document when moved in the opposite direction, an arcuate platen hinged to said casing for holding said document in said document position, and means actuated by said platen for releasing said operating means from said projecting means to permit movement of said projecting means for scanning said document.

8. In a photographic copying apparatus having a casing, a document position and an exposure field, the combination with an arcuate document supporting means for supporting a document in said document position, a second arcuate supporting means spaced from said first mentioned supporting means for supporting a sensitized material in said exposure field, of a scanning means mounted for angular movement and positioned between said document position and said exposure field for scanning a document in said document position, a rotatable projecting means associated with and having the same angular movement as said scanning means for directing successive portions of the document image from said scanning means onto the sensitized material, an advancing means for said sensitized material, an actuating means adjacent said casing and document position, and means for selectively connecting said actuating means and said advancing means when said actuating means is moved in one direction to advance said sensitized material a predetermined distance in accordance with the initial position of said actuating means and adapted to be disengaged from said advancing means before said actuating means is moved in the opposite direction to position said projecting means.

9. In a photographic copying apparatus having a casing, a document position and an exposure field, the combination with an arcuate document supporting means for supporting a document in said document position, a second arcuate supporting means spaced from said first mentioned supporting means for supporting a sensitized material in said exposure field, of a scanning means mounted for angular movement and positioned between said document position and said exposure field for scanning a document in said document position, a rotatable projecting means associated with and having the same angular movement as said scanning means for directing successive portions of the document image from said scanning means onto the sensitized material, an advancing means for said sensitized material, including drive rolls for said sensitized material and a drive means for said drive rolls, an actuating means adjacent said casing and said document position, and means carried by said actuating means for selectively connecting said actuating means to said drive means when said actuating means is moved in one direction to advance said sensitized material a predetermined distance in accordance with the initial position of said actuating means and adapted to be disengaged from said drive means before said actuating means is moved in the opposite direction to position said projecting means in accordance with the size of said document.

10. In a photographic copying apparatus having a casing, a document position and an exposure field, the combination with an arcuate document supporting means for supporting a document in said document position, a second arcuate supporting means spaced from said first mentioned supporting means for supporting a sensitized material in said exposure field, of a scanning means mounted for angular movement and positioned between said document position and said exposure field for scanning a document in said document position, a rotatable projecting means associated with and having the same angular movement as said scanning means for directing successive portions of the document image from said scanning means onto the sensitized material, advancing means for said sensitized material, an actuating means, including an operating member adjacent said casing and document position, a shaft for said operating member and a supporting member on said shaft, means carried by said supporting member for connecting said actuating means to said advancing means when said operating member is moved in one direction to advance said sensitized material a predetermined distance in accordance with the initial position of said operating member and adapted to be disengaged from said drive means before said actuating means reaches the end of its movement, a latch member pivotably mounted on said supporting member and adapted to connect said actuating means to said projecting means when said actuating means has reached the end of its movement in said one direction for movement in the opposite direction to position said projecting means in accordance with the size of said document, an arcuate platen hinged to said casing for holding said document in said document position, and means carried by said shaft and actuated by said platen for releasing said latch member from said projecting means to permit movement of said projecting means for scanning said document.

11. In a photographic copying apparatus having a casing, a document position and an exposure field, the combination with an arcuate document supporting means for supporting a document in said document position, a second arcuate supporting means spaced from said first mentioned supporting means for supporting a sensitized material in said exposure field, of a scanning means, including a light restricting member and illuminating means for said document carried by said light restricting member adjacent said document position, said scanning means being mounted for angular movement and positioned between said document position and said exposure field for scanning a document in said document position, a rotatable projecting means associated with and having the same angular movement as said scanning means, including a rotatable lens mount for directing successive portions of the document image from said scanning means onto the sensitized material, means for connecting said scanning means to said lens mount, a mirror positioned between said lens mount and said sensitized material in said exposure field to give lateral inversion of said document image, an advancing means for said sensitized material, an actuating means adjacent said casing and document position, and means for selectively connecting said actuating means and said advancing means when said actuating means is moved in one direction to advance said sensitized material a predetermined distance in accordance with the initial position of said actuating means and adapted to be disengaged from said advancing means before said actuating means is moved in the opposite direction to position said projecting means.

12. In a photographic copying apparatus having a casing, a document position and an exposure field, the combination with an arcuate document supporting means for supporting a document in said document position, a second arcuate supporting means spaced from said first mentioned supporting means for supporting a sensitized material in said exposure field, of a scanning means, including a light restricting member and illuminating means for said document carried by said light restricting member adjacent said document position, said scanning means being mounted for angular movement and positioned between said document position and said exposure field for scanning a document in said document position, a rotatable projecting means associated with and having the same angular movement as said scanning means, including a rotatable lens mount for directing successive portions of the document image from said scanning means onto the sensitized material, means for connecting said scanning means to said lens mount, a mirror positioned between said lens mount and said sensitized material in said exposure field to give lateral inversion of said document image, advancing means for said sensitized material, including drive rolls for said sensitized material and a drive means for said drive rolls, an actuating means adjacent said casing and said document position, and means carried by said actuating means for selectively connecting said actuating means to said drive means when said actuating means is moved in one direction to advance said sensitized material a predetermined distance in accordance with the initial position of said actuating means and adapted to be disengaged from said drive means before said actuating means is moved in the opposite direction to position said projecting means in accordance with the size of said document.

13. In a photographic copying apparatus having a casing, a document position and an exposure field, the combination with an arcuate document supporting means for supporting a document in said document position, a second arcuate supporting means spaced from said first mentioned supporting means for supporting a sensitized material in said exposure field, of a scanning means, including a light restricting member and illuminating means for said document carried by said light restricting member adjacent said document position, said scanning means being mounted for angular movement and positioned between said document position and said exposure field for scanning a document in said document position, a rotatable projecting means associated with and having the same angular movement as said scanning means, including a rotatable lens mount for directing successive portions of the document image from said scanning means onto the sensitized material, means for connecting said scanning means to said lens mount, a mirror positioned between said lens mount and said sensitized material in said exposure field to give lateral inversion of said document image, advancing means for said sensitized material, an actuating means, including an operating member adjacent said casing and document position, a shaft for said operating member and a supporting member on said shaft, means carried by said supporting member for connecting said actuating means to said advancing means when said operating member is moved in one direction to advance said sensitized material a predetermined distance in accordance with the initial position of said operating member and adapted to be disengaged from said drive means before said actuating means reaches the end of its movement, a latch member pivotally mounted on said supporting member and adapted to connect said actuating means to said projecting means when said actuating means has reached the end of its movement in said one direction for movement in the opposite direction to position said projecting means in accordance with the size of said document, an arcuate platen hinged to said casing for holding said document in said document position, and means carried by said shaft and actuated by said platen for releasing said latch member from said projecting means to permit movement of said projecting means for scanning said document.

14. In a photographic copying apparatus having a casing, a document position and an exposure field, the combination with an arcuate document supporting means, including an arcuate transparent sheet for positioning the document thereon and an arcuate support on said casing for said transparent sheet, a second supporting means spaced from the first mentioned supporting means, including an arcuate support on said casing for the sensitized material in said exposure field and a platen hinged to said casing for holding said sensitized material on said arcuate support, of a projecting means positioned between said document position and said exposure field, including an objective adapted to be rotated about its Gauss point for projecting successive portions of said document in said document position onto said sensitized material, a mirror positioned between said objective and said exposure field to give lateral inversion of said document image, and illuminating means for said document adapted to be rotated with said objective adjacent said document position, a drive means connected to said projecting means, an arcuate platen hinged to said casing for holding said document on said document supporting means, and means actuated by said platen for releasing said drive means when said platen is moved from an inoperative position to a document holding position.

15. In a photographic copying apparatus having a casing, a document position and an exposure field, the combination with an arcuate document supporting means, including an arcuate transparent sheet for positioning the document thereon and an arcuate support on said casing for said transparent sheet, a second supporting means spaced from the first mentioned supporting means, including an arcuate support on said casing for the sensitized material in said exposure field and a platen hinged to said casing for holding said sensitized material on said arcuate support, of a projecting means positioned between said document position and said exposure field, including an objective adapted to be rotated about its Gauss point for projecting successive portions of said document in said document position onto said sensitized material, a mirror positioned between said objective and said exposure field to give lateral inversion of said document image, and illuminating means for said document adapted to be rotated with said objective adjacent said document position, a drive means connected to said projecting means, means connected to said drive means for varying the angular velocity of said projecting means and thereby varying the exposure of said sensitized material, an electrical circuit, including a switch pivotably mounted on said casing for said illuminating means, an arcuate platen hinged to said casing for holding said document on said document supporting means, and means actuated by said platen for simultaneously releasing said drive means and closing said electrical circuit as said platen is moved from an inoperative position to the document holding position.

16. In a photographic copying apparatus having a casing, a document position and an exposure field, the combination with an arcuate document supporting means, including an arcuate transparent sheet for positioning the document thereon and an arcuate support on said casing for said transparent sheet, a second supporting means spaced from the first mentioned supporting means, including an arcuate support on said casing for the sensitized material in said exposure field and a platen hinged to said casing for holding said sensitized material on said arcuate support, of a projecting means positioned between said document position and said exposure field, including an objective adapted to be rotated about its Gauss point for projecting successive portions of said document in said document position onto said sensitized material, a mirror positioned between said objective and said exposure field to give lateral inversion of said document image, and illuminating means for said document adapted to be rotated with said objective adjacent said document position, an advancing means for said sensitized material, including drive rolls for said sensitized material and a drive means for said drive rolls, an actuating means adjacent said casing and said document position, means carried by said actuating means for selectively connecting said actuating means to said drive means when said actuating means is moved in one direction to advance said sensitized material a predetermined distance in accordance with the initial position of said actuating means and adapted to be disengaged from said drive means before said actuating means is moved in the opposite direction to position said projecting means in accordance with the size of said document, and means slidably mounted in said casing for indicating the amount of sensitized material exposed and actuated by said actuating means after said actuating means has been disengaged from said drive means.

ROY S. HOPKINS.